United States Patent [19]

Uchikubo et al.

[11] Patent Number: 4,894,715
[45] Date of Patent: Jan. 16, 1990

[54] ELECTRONIC ENDOSCOPE

[75] Inventors: Akinobu Uchikubo; Masahiko Sasaki; Katsuyuki Saito; Masahide Kanno, all of Hachioji; Jun Hasegawa, Hino, all of Japan

[73] Assignee: Olympus Optical Co., Ltd., Tokyo, Japan

[21] Appl. No.: 244,215

[22] Filed: Sep. 14, 1988

[30] Foreign Application Priority Data

Jan. 8, 1988 [JP] Japan .................. 63-002044

[51] Int. Cl.$^4$ .................. H04N 7/18; A61B 1/04
[52] U.S. Cl. .................. 358/98; 358/160; 358/183
[58] Field of Search .................. 358/98, 22, 183, 180, 358/160, 140; 128/6

[56] References Cited

U.S. PATENT DOCUMENTS

| 4,334,245 | 6/1982 | Michael | 358/180 X |
| 4,633,855 | 1/1987 | Baba | 128/6 |
| 4,660,081 | 4/1987 | Uchikubo | 358/160 |

FOREIGN PATENT DOCUMENTS 196719 10/1985 Japan .
62-211040 9/1987 Japan .

Primary Examiner—Tommy P. Chin
Assistant Examiner—Victor R. Kostak
Attorney, Agent, or Firm—Armstrong, Nikaido, Marmelstein, Kubovcik & Murray

[57] ABSTRACT

An electronic endoscope apparatus whereby a picture image can be displayed at any desired displaying view angle irrespective of the pixel formation of a solid state imaging device, the picture image magnification rate and contraction rate of an observed object and the television broadcasting system comprises an imaging apparatus having a solid state imaging device outputting an object image as an electric signal and a video signal processing circuit driving the solid state imaging device and processing the read out electric signal to produce a video signal. The object image imaged by the solid state imaging device will be magnified or contracted by a picture image displaying magnification rate varying apparatus which can either magnify or contract the object image in at least one of the vertical direction and horizontal direction. The object image either magnified or contracted by the picture image displaying magnification rate varying apparatus will be displayed by a monitor. The view angle of the picture image displayed in the monitor will be adjusted by a picture image displaying magnification rate controlling apparatus which can control the magnification rate independently in at least one of the vertical direction and horizontal direction. The picture image displaying magnification rate controlling apparatus has a sensing and instructing apparatus sensing or instructing the factor varying the displaying view angle and outputting a signal relating to the picture image displaying magnification rate to the picture image displaying magnification rate controlling apparatus.

40 Claims, 19 Drawing Sheets

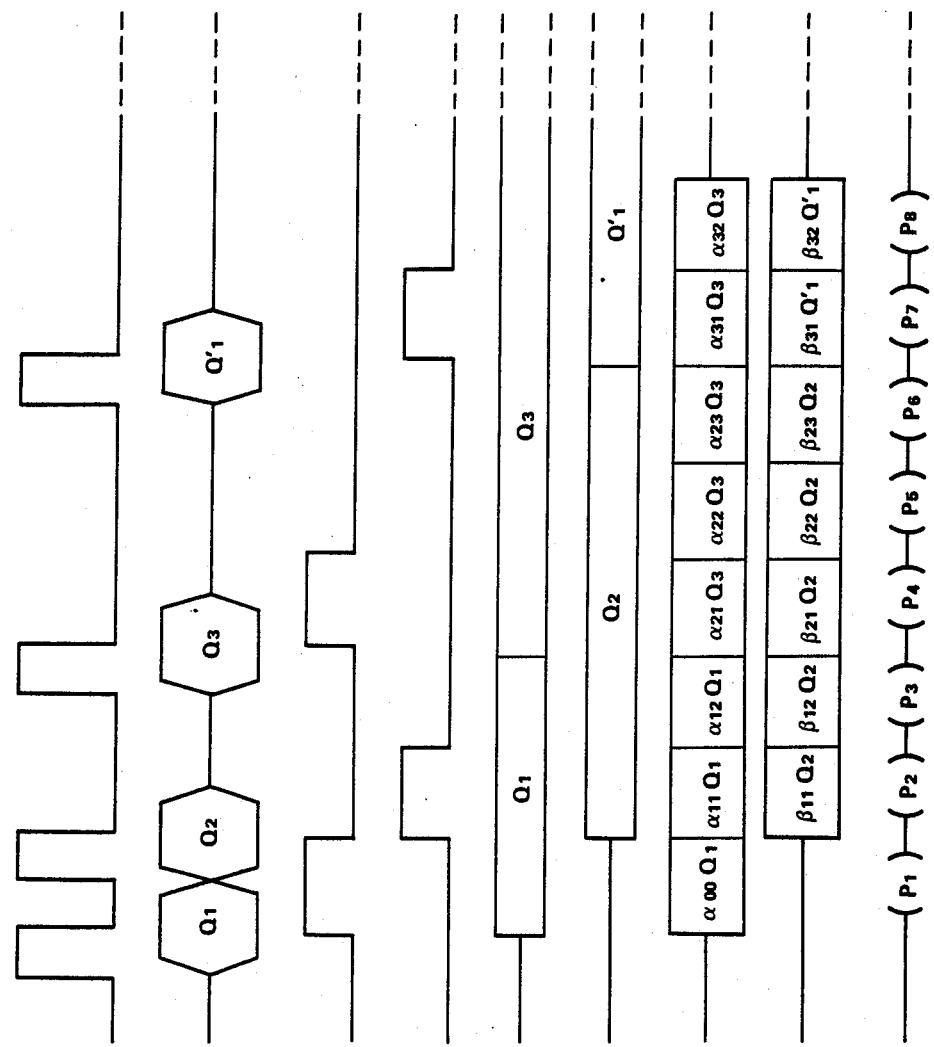

FIG. 7(a)

| P \ Q | $Q_1$ | $Q_2$ | $Q_3$ | $Q'_1$ |
|---|---|---|---|---|
| $P_1$ | 1 | 0 | | |
| $P_2$ | 5/8 | 3/8 | | |
| $P_3$ | 2/8 | 6/8 | | |
| $P_4$ | | 7/8 | 1/8 | |
| $P_5$ | | 4/8 | 4/8 | |
| $P_6$ | | 1/8 | 7/8 | |
| $P_7$ | | | 6/8 | 2/8 |
| $P_8$ | | | 3/8 | 5/8 |
| $P'_1$ | | | | 1 |

FIG. 7(b)

$P_1 = 1 \cdot Q_1$ $P_2 = 5/8 \cdot Q_1 + 3/8 \cdot Q_2$ $P_3 = 2/8 \cdot Q_1 + 6/8 \cdot Q_2$ $P_4 = 1/8 \cdot Q_3 + 7/8 \cdot Q_2$ $P_5 = 4/8 \cdot Q_3 + 4/8 \cdot Q_2$ $P_6 = 7/8 \cdot Q_3 + 1/8 \cdot Q_2$ $P_7 = 6/8 \cdot Q_3 + 2/8 \cdot Q'_1$ $P_8 = 3/8 \cdot Q_3 + 5/8 \cdot Q'_1$ $P'_1 = 1 \cdot Q'_1$ (α arrow points to first column; β arrow points to second column)

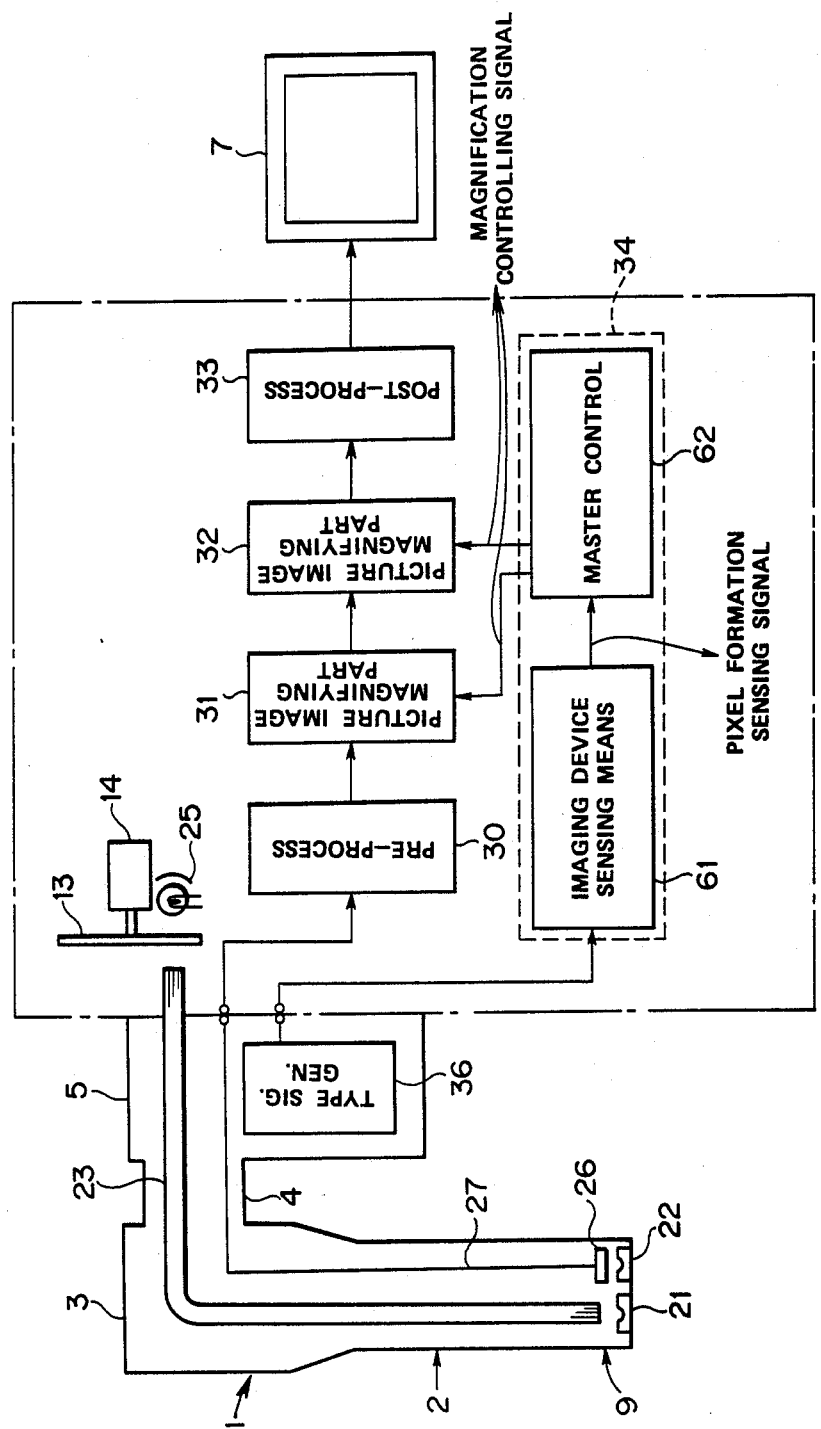

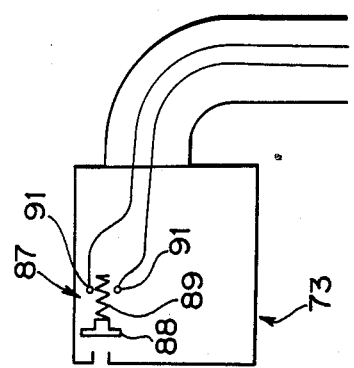
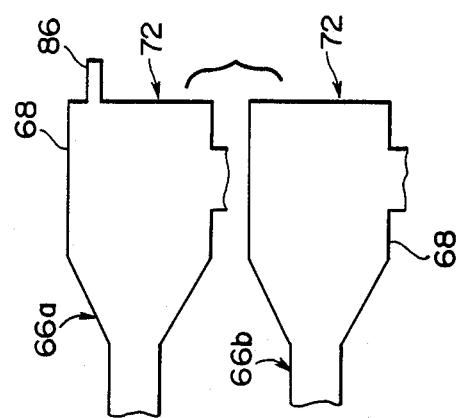

ELECTRONIC ENDOSCOPE

FIELD OF THE INVENTION

This invention relates to an electronic endoscope apparatus whereby a picture image can be displayed at any desired displaying view angle irrespective of the pixel formation of a solid state imaging device, the picture image magnification rate and contraction rate of an observed object and the television broadcasting system.

BACKGROUND OF THE INVENTION

Recently, there is extensively utilized an endoscope whereby organs within a body cavity can be observed with an elongated insertable part inserted into the body cavity or, as required, various therapeutic treatments can be made by using a treating tool inserted through a treating tool channel.

Various electronic endoscopes wherein such solid state imaging device as a charge coupled device (CCD) is used as an imaging means have been suggested.

Now, in the conventional video camera, the pixel size or the number of longitudinal and lateral pixels (which shall be mentioned as the pixel formation hereinafter) of the imaging device (solid state imaging device) has been of only one kind and no imaging device of two or more kinds has been used. Even in the above mentioned electronic endoscope, the solid state imaging device to be used has been limited to be of one kind.

However, recently, with the development of the endoscope medical science, the observed parts have come to be complicated and manifold and the endoscope tip has come to be required to be finer in the diameter. The allowable outside diameter of the endoscope is different between such thick tube as the large intestine and such thin tube as the bronchus. Therefore, the solid state imaging device of a pixel formation matching a thick tube is too large in the size to form an endoscope for a thin tube. On the contrary, the solid state imaging device matching a thin tube is smaller in the outside diameter than that of the endoscope for a thick tube, therefore produces an excess space, results in wasting the part to be naturally an imaging surface and is not efficient. Therefore, an endoscope having a pixel formation corresponding to the observed part has come to be required.

In an electronic endoscope for observing a body cavity interior by using a solid state imaging device, an electronic zooming function really magnifying the picture image of an affected part has come to be noted as a method of observing the affected part in detail. However, in the conventional electronic endoscope, as the magnification rate of the picture image is fixed, when a solid state imaging device having a different pixel formation is driven, the output picture image will be compressed longitudinally or laterally. In case a solid state imaging device for a small diameter electronic endoscope having a small number of pixels is used, the displaying view angle will be so small that no sufficient observation effect will be obtained. The number of longitudinal scanning lines is 525 in the NTSC system, is 625 in the PAL system and is thus different depending on the television broadcasting. Therefore, in case the solid state imaging device is driven by the same clock, in the PAL system, as compared with the NTSC system, the size of the longitudinal picture surface will be compressed to be 525/625, the view angle will become smaller and, the same as in the above described example, no sufficient observation effect will be obtained. Therefore, as the clock has been changed in the NTSC system and PAL system, the unit relating to the timing has had to be replaced.

By the way, an example wherein whether a mask is formed or not can be automatically set by discriminating the kind of the endoscope is disclosed in the publication of a Japanese patent application laid open No. 211040/1987. However, even in this prior art example, in case a solid state imaging device having a different pixel formation is used or in case the television broadcasting system is different, the size of the picture image will vary.

OBJECT AND SUMMARY OF THE INVENTION

An object of the present invention is to provide an electronic endoscope apparatus whereby a picture image can be displayed at any desired displaying view angle irrespective of the pixel formation of a solid state imaging device, the picture image magnification rate of an observed object and the television broadcasting system.

The electronic endoscope apparatus of the present invention comprises an imaging means having a solid state imaging device outputting an object image as an electric signal; a video signal processing means driving the solid state imaging device and processing the read out electric signal to produce a video signal; an picture image displaying magnification rate varying means which can either magnify or contract in at least one of the vertical direction and horizontal direction the object image imaged by the solid state imaging device by inputting the video signal; a monitor means displaying the object image magnified or contracted by the picture image displaying magnification rate varying means; a picture image displaying magnification rate controlling means which can control independently in at least one of the vertical direction and horizontal direction the picture image displaying magnification rate of the picture image displaying magnification varying means to adjust the view angle of the picture image displayed by the monitor means; and a sensing and instructing means sensing or instructing the factor varying the displaying view angle and outputting a signal relating to the picture image displaying magnification rate to the above mentioned picture image displaying magnification rate controlling means.

The other features and advantages of the present invention will become apparent enough with the following explanation.

BRIEF DESCRIPTION OF THE DRAWINGS

FIGS. 1 to 10 relate to the first embodiment of the present invention.

FIG. 1 is a conception diagram of this embodiment.

FIG. 2 is a side view showing an entire electronic endoscope apparatus.

FIG. 3 is a block diagram showing the formation of the electronic endoscope apparatus.

FIG. 4 is a block diagram showing the formation of a horizontal picture image magnifying part.

FIG. 5 is an explanatory view showing the operation of the horizontal picture image magnifying part.

FIGS. 6a–6i are timing chart views showing the operation of the horizontal picture image magnifying part.

FIGS 7a and 7s are explanatory views showing an example of an interpolating coefficient.

FIG. 8 is a block diagram showing the formation of a vertical picture image magnifying part.

FIG. 10 is a block diagram showing an example of a magnification controlling part.

FIGS. 13 to 16 relate to the fourth embodiment of the present invention.

FIG. 13 is an explanatory view of an entire endoscope apparatus provided with an externally fitted television camera.

FIGS. 15a and 15b are explanatory views of another endoscope sensing part.

FIG. 16 is a block diagram for explaining the formation of an endoscope apparatus.

FIG. 18 is an explanatory view of an entire endoscope apparatus provided with an externally fitted television camera.

FIG. 19 is an explanatory view of an endoscope apparatus having a scope sensing circuit in the connector part.

FIG. 20 is a block diagram of an endoscope apparatus having a magnifying circuit and contracting circuit.

FIG. 21 is a block diagram for explaining a contracting circuit.

FIG. 22 is a block diagram for explaining a master control.

Detailed Description of Preferred Embodiments of the Invention

FIGS. 1 to 10 shows the first embodiment of the present invention.

Figure 1:
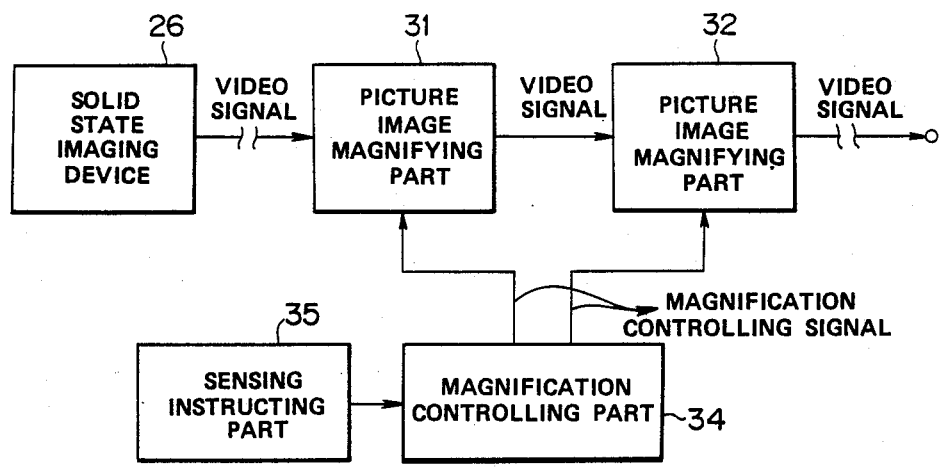

The summary of this embodiment shall be explained with reference to the conception view of FIG. 1.

A video signal obtained from a solid state imaging device 26 will be magnified and interpolated in the vertical or horizontal direction by a first picture image magnifying part 31 as a picture image displaying magnification rate varying means. The video signal from this first picture image magnifying part 31 will be magnified and interpolated in the direction at right angles with the direction in which the video signal has been magnified by the above mentioned first picture image magnifying part 31 by a second picture image magnifying part 32 as a picture image displaying magnification rate varying means. That is to say, one of the above mentioned picture image magnifying parts 31 and 32 is a vertical picture image magnifying part and the other is a horizontal picture image magnifying part. The above mentioned picture image magnifying parts 31 and 32 are to be controlled in the magnification rate of the picture image and the rate of the interpolation by a magnification rate controlling part 34 as a picture image displaying magnification rate controlling means. In the above mentioned magnification rate controlling part 34, the displaying view angle will be controlled to be of any desired size by a control signal from a sensing and instructing part 35 as a sensing and instructing means sensing or instructing the factor varying the view angle.

This embodiment shall be concretely explained in the following.

Figure 2:
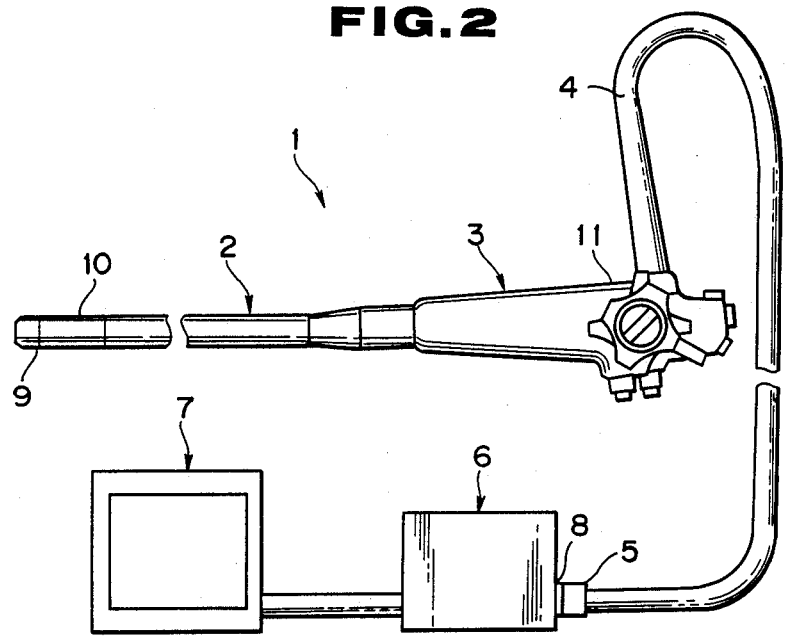

As shown in FIG. 2, the electronic endoscope apparatus of this embodiment is provided with an electronic endoscope 1; a video processor 6 containing a light source apparatus and signal processing circuit and connected with the above mentioned electronic endoscope 1; and a monitor 7 connected to this video processor 6.

The above mentioned electronic endoscope 1 is provided with an elongated, for example, flexible insertable part 2 and a thick operating part 3 connected to this insertable part 2 at the rear end. A flexible universal cord 4 is extended sidewise from the above mentioned operating part 3 and is provided at the tip with a connector 5 to be connected to a connector receptacle 8 of the above mentioned video processor 6.

The above mentioned insertable part 2 is provided on the tip side in turn with a rigid tip part 9 and a curvable part 10 curvable rearward and adjacent to this tip part 10. The above mentioned operating part 3 is provided with a curving operation knob 11 so that the above mentioned curvable part 10 may be curved vertically and horizontally by rotating this curving operation knob 11.

Figure 3:
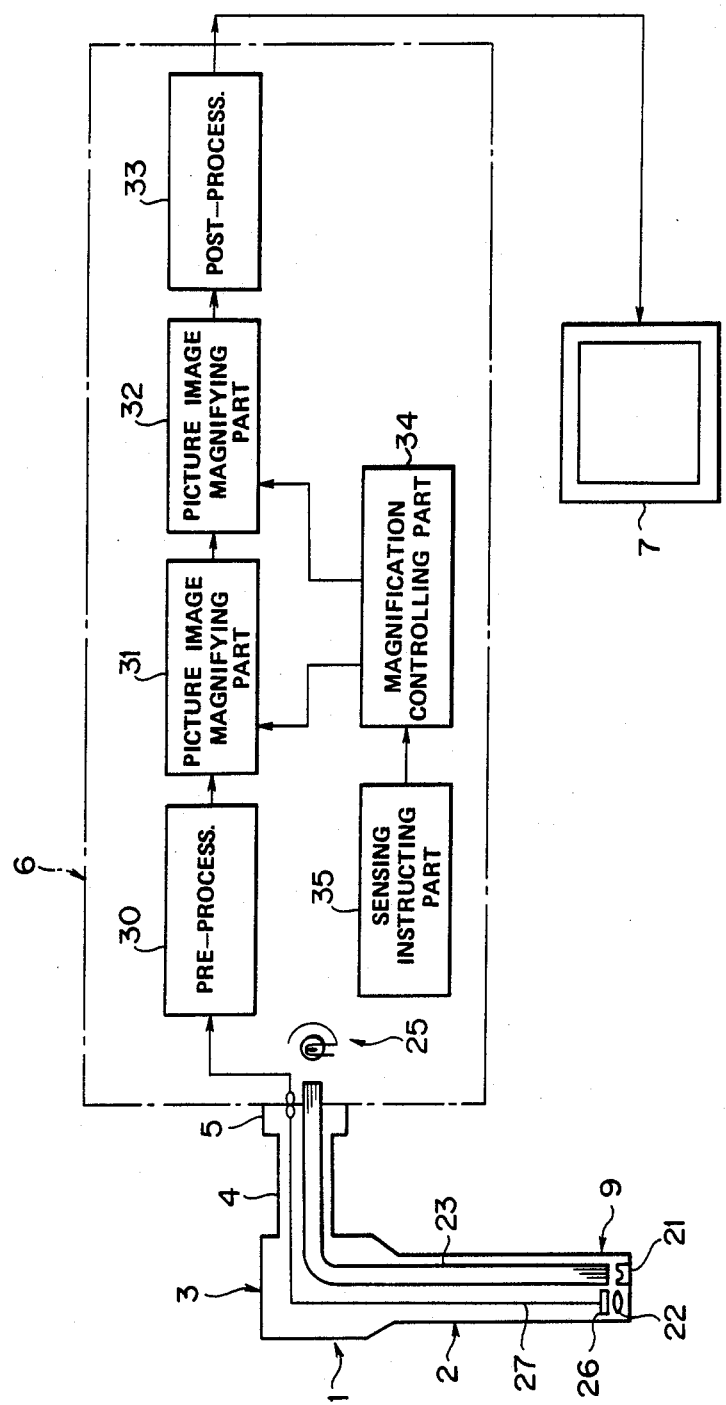

As shown in FIG. 3, a light distributing lens 21 and image forming optical system 22 are arranged in the above mentioned tip part 9. A light guide 23 consisting of a fiber bundle is provided on the rear end side of the above mentioned light distributing lens 21, is inserted through the above mentioned insertable part 2, operating part 3 and universal cord 4 and is connected to the above mentioned connector 5. When this connector 5 is connected to the above mentioned video processor 6, the illuminating light emitted from the light source 25 within this video processor 6 will enter the above mentioned light guide 23 at the entrance end, will be led t the tip part 9 through the above mentioned light guide 23 will be emitted from the tip surface and will be radiated to an object through a light distributing lens 21.

On the other hand, a solid state imaging device 26 is arranged in the image forming position of the above mentioned image forming optical system 22. By the way, a color filter array not illustrated arranging the respective color transmitting filters of red (R), green (G) and blue (B) in the form of a mosaic is arranged on the front surface of the above mentioned solid state imaging device 26. A signal line 27 is connected to the above mentioned solid state imaging device 26, is inserted through the above mentioned insertable part 2, operating part 3 and universal cord 4 and is connected to the above mentioned connector 5. The object image of the inspected part illuminated by the above mentioned illuminating light will be formed by the above mentioned image forming optical system 22 and will be converted to an electric signal by the above mentioned solid state imaging device 26. The output signal of this solid state imaging device 26 will be input through the above mentioned signal line 27 into a pre-processing circuit 30 provided within the above mentioned video processor 6.

The output signal of the above mentioned solid state imaging device 26 will have the wavelength inspected will be processed to have the AGC (automatic gain control) and $\gamma$ corrected then will be A/D converted in the above mentioned pre-processing circuit 30 and will be output as a digital signal. This digital output signal of the pre-processing circuit 30 will be input into a first picture image magnifying part 31, will be magnified and interpolated in the vertical or horizontal direction. The video signal from this first picture image magnifying part 31 will be input into a second picture image magnifying part 32 and will be magnified an interpolated in the direction at right angles with the direction in which the video signal has been magnified by the above mentioned first picture image magnifying part 31. As described above, of the above mentioned picture image magnifying parts 31 and 32, one is a vertical picture image magnifying part and the other is a horizontal picture image magnifying part. Further, the information relating to the view angle of the electronic endoscope 1 will be input into a magnification rate controlling part 34 from the above mentioned sensing and instructing part 35 having such external input means as, for example, a push-switch and a control signal representing the magnification rate and the rate of the interpolation of the picture image corresponding to the information will be output to the above mentioned picture image magnifying parts 31 and 32.

The video signal from the above mentioned second picture image magnifying part 32 will be input into a post-processing circuit 33, will be D/A converted, will be processed to have the outline or the like corrected and then will be output to the monitor 7 in which the object image will be displayed.

Figure 4:
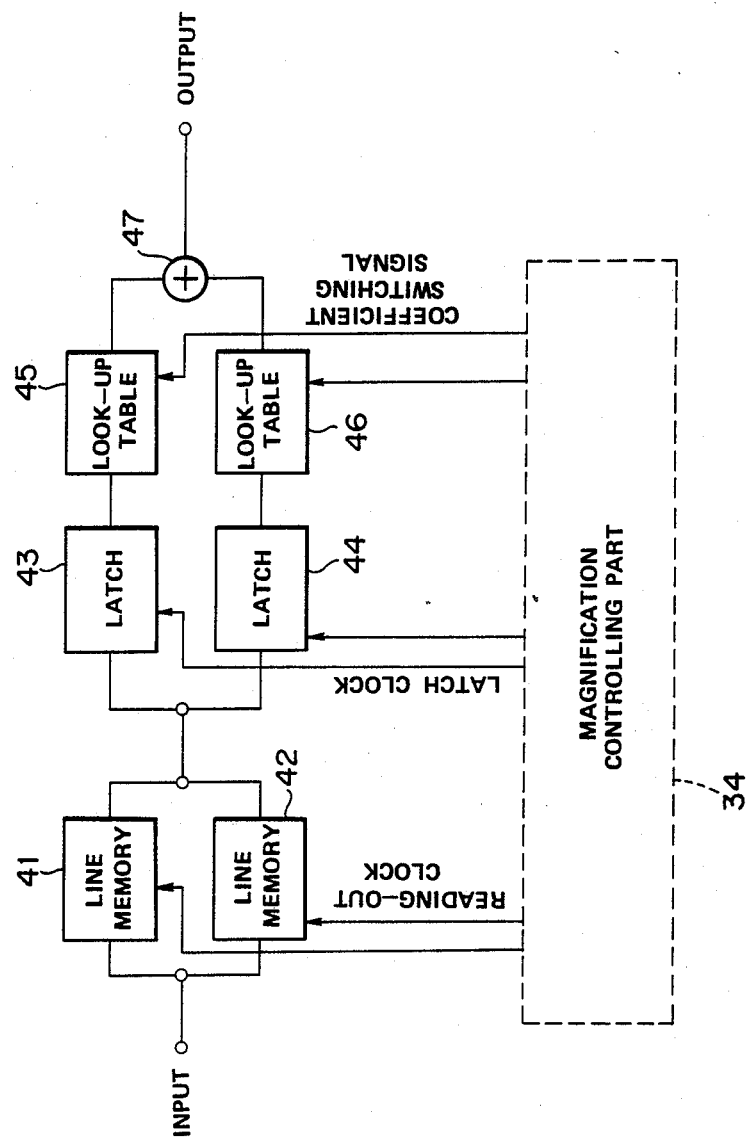

An example of the horizontal picture image magnifying part which is the above mentioned first picture image magnifying part 31 or second picture image magnifying part 32 is shown in FIG. 4.

This horizontal picture image magnifying part comprises two line memories 41 and 42 in which a digital video signal is input and the writing-in operation and reading-out operation are alternately switched, two latches 43 and 44 in which the outputs of the above mentioned memories 41 and 42 are respectively input, look-up tables 45 and 46 wherein the outputs of the above mentioned latches 43 and 44 are respectively multiplied by interpolating coefficients $\alpha ij$ and $\beta ij$ (wherein $\alpha ij \leq 1$, $\beta ij \leq 1$, $\alpha ij + \beta ij = 1$, i and j are integers) and an adder 47 wherein the outputs of these look-up tables 45 and 46 are added and output. The signal will be written on each line alternately into the above mentioned line memories 41 and 42 and will be read out as synchronized with the clock signal read out of the magnification rate controlling part 34. Only the signals synchronized with the latch clock from the above mentioned magnification controlling part 34 will be accumulated in the above mentioned latches 43 and 44. The signals accumulated in these latches 43 and 44 will continue to be held until the next latch clock is transmitted from the next latch clock. The output of the above mentioned latches 43 and 44 will be multiplied respectively by the interpolating coefficients $\alpha ij$ and $\beta ij$ in the look-up tables 45 and 46. These interpolating coefficients $\alpha ij$ and $\beta ij$ will be switched for each pixel by a coefficient switching signal from the above mentioned magnification rate controlling part 34.

The operation of the above mentioned horizontal picture image magnifying part shall be explained with reference to FIGS. 5 to 7.

A digital video signal will be written on each line alternately into the line memories 41 and 42 and data of Q1, Q2, Q3 and Q'1 1 will be output as shown in FIG. 6 (b) out of these line memories 41 and 42 according to such reading-out clock from the magnification rate controlling part 34 as is shown in FIG. 6 (a) and will be accumulated in the latches 43 and 44 in response to such latch clocks as are shown in Figs. 6 (c) and (d). That is to say, at first, the data Q1 will be stored in the latch 43 according to such latch clock as is shown in FIG. 6 (c), will be held until the next latch clock is transmitted and will continue to be output to the look-up table 45 as shown in FIG. 6 (e). According to the next latch clock, data Q3 will be stored in the above mentioned latch 43. Further, the data Q3 will continue to be output to the look-up table 45 until the next latch clock is transmitted. On the other hand, according to such latch clock as is shown in FIG. 6 (d), at first, data Q2 will be stored in the latch 44. The data Q2 will be held until the next latch clock is transmitted and will continue to be output to the look-up table 46 as shown in FIG. 6 (f). According to the next latch clock, data Q1' will be stored in the above mentioned latch 44 and will continue to be output to the look-up table 45 until the next latch clock is transmitted.

In the above mentioned look-up tables 45 and 46, in response to data P1 to P1' after the interpolation, the above mentioned data Q1 to Q1' will be multiplied by such interpolating coefficients $\alpha ij$ and $\beta ij$ as are shown, for example, in FIG. 7 (a). By the way, shown in FIG. 7 is an example of an interpolation in a magnification rate of 8/3. In FIG. 7 (a), the values on the left side represent $\alpha ij$ and the values on the right side represent $\beta ij$. $\alpha 00$, $\alpha 11$, $\alpha 12$, $\alpha 21$, $\alpha 22$, $\alpha 31$, $\alpha 32$, $\beta 11$, $\beta 12$, $\beta 21$, $\beta 22$, $\beta 23$, $\beta 31$ and $\beta 32$ in the order from above in FIGS. 5 and 6 correspond to the values of the interpolating coefficients $\alpha ij$ and $\beta ij$ in FIG. 7. The data multiplied by these interpolating coefficients will be output from the look up tables 45 and 46.

By adding the outputs of the above mentioned look-up tables 45 and 46 in an adder 47, data P1 to P1' after the interpolation according to such calculating formulae as are shown in FIG. 7 (b) will be obtained and will be output as shown in FIG. 6 (i).

Figure 5:
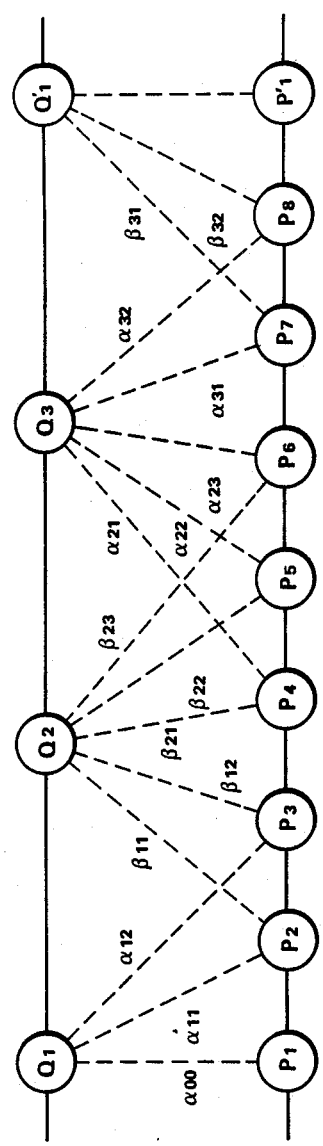

The relations between the data Q1 to Q1' of the original picture image and the data P1 to P1' after the interpolation are shown in FIG. 5. As shown in FIG. 5, the values of the above mentioned interpolating coefficients $\alpha ij$ and $\beta ij$ depend on what position relation the pixel data P made by the interpolation are in with the pixel data Q of the base of the interpolation. At this time, the values can be represent by $Pk = \alpha ij \, Qkl + \beta ij \, Q(l+1)$. The above mentioned look-up tables 45 and 46 provide $\alpha ij$ and $\beta ij$ most suitable respectively for the factor varying the view angle and vary the values of $\alpha ij$ and $\beta ij$ according to the coefficient switching signal of the magnification rate controlling part 34 to obtain a desired view angle.

According to the horizontal picture image magnifying part of such formation, by only switching the control signal of the magnification rate controlling part 34, without varying the circuit formation, any picture image can be magnified and interpolated in the horizontal direction and any displaying view angle can be freely set.

By the way, in the above mentioned horizontal picture image magnifying depart, the reading-out address may be sequentially accessible. The look-up tables 45 and 46 and adder 47 may be formed of one multiplying adder. The parts after the line memories 41 and 42 may be formed of an analogue processing circuit. This horizontal picture image magnifying part may be either of the first picture image magnifying part 31 and second picture image magnifying 32 shown in FIG. 3.

Figure 8:
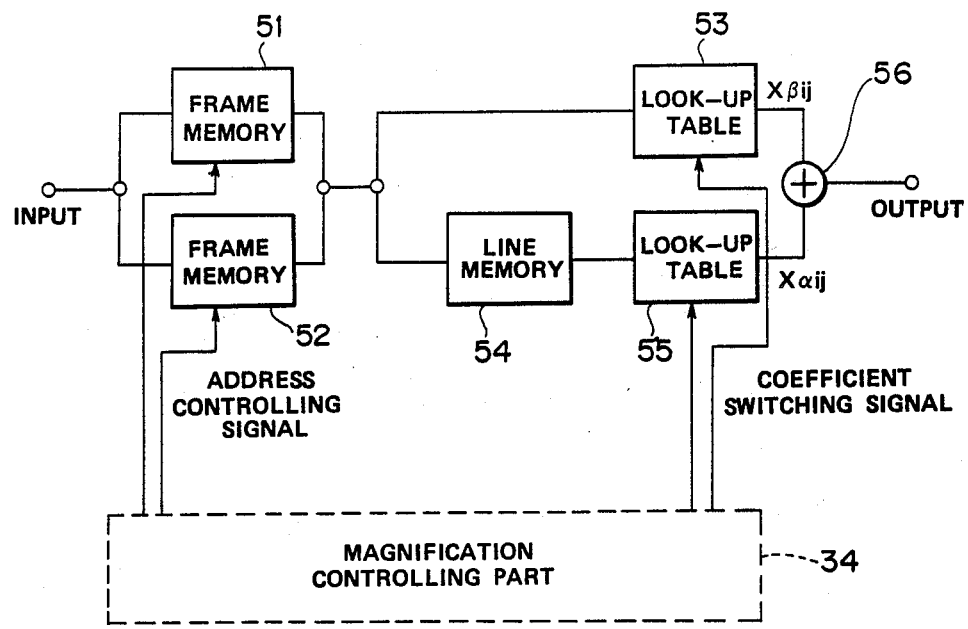

An example of a vertical picture image magnifying part which is the above mentioned first picture image magnifying part 31 or second picture image magnifying part 32 is shown in FIG. 8.

Figure 9A:
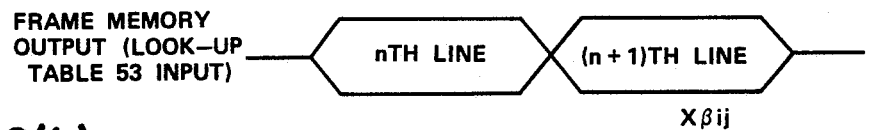
FIGS. 9a-9c are timing chart views showing the operation of the vertical picture image magnifying part.
Figure 9B:
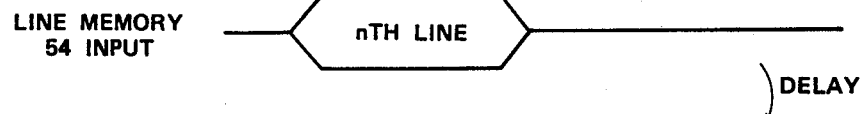
Figure 9C:

This vertical picture image magnifying part is provided with two frame memories 51 and 52 into which a digital video signal is input and to which a writing-in operation and reading-out operation are alternately switched. These frame memories 51 and 52 will alternately write in and read out the video signal in a frame unit. The address read out will be accessible at random by an address controlling signal from the magnification rate controlling part 34. The output of the above mentioned frame memory 51 or 52 will read out the data required for the first field among all the data so as to reduce the addresses and then will read out the same for the second field. At this time, as shown in FIG. 9 (a), adjacent two lines (the nth line and (n+1)th line) will be read out of the above mentioned frame memories 51 and 52 at a double speed in one horizontal scanning period and will be input into the look-up table 53. As shown in FIG. 9 (b), the nth line read out first of these two adjacent liens will be input into the line memory 54, will be delayed by this line memory 54, will be synchronized with the (n+1)th line read out later and will be input into the look-up table 55.

The synchronized nth line and (n+1)th line input into the above mentioned look-up tables 55 and 53 will be multiplied respectively by $\alpha ij$ and $\beta ij$ ($\alpha ij \leq 1$, $\beta ij \leq 1$, $\alpha ij + \beta ij = 1$) by the above mentioned look-up tables 55 and 53 and will be added by the adder 56 to obtain new scanning line data of a vertically magnified picture image. By the way, the same as in the case of such horizontal magnification as is shown in FIG. 5, the values of the above mentioned $\alpha ij$ and $\beta ij$ depend on what position relation with the scanning line data Q of the base of the interpolation the scanning line data P made by the interpolation are in. At this time, P can be represented as $$k = \alpha ij\, Ql + \beta ij\, Q(l+1)$$

The above mentioned look-up tables 53 and 55 provide respectively $\alpha ij$ and $\beta ij$ most suitable to the factor varying the view angle and vary the values of $\alpha ij$ and $\beta ij$ according to the coefficient switching signals of the magnification rate controlling part 34 to obtain any desired view angle.

According to the vertical picture image magnifying part of such formation, by only switching the control signal of the magnification controlling part 34, without varying the circuit formation, any picture image can be magnified and interpolated in the vertical direction and the displaying view angle can be freely set.

By the way, in the above mentioned vertical picture image magnifying part, the line memory 54 can be replaced with a digital delay line and the look-up tables 53 and 55 and adder 56 may be formed of one multiplying adder. The parts after the frame memories 51 and 52 may be formed of an analogue processing circuit. This vertical picture image magnifying part may be wither of the first picture image magnifying part 31 and second picture image magnifying part 32 shown in FIG. 3.

An example of the above mentioned magnification rate controlling part 34 is shown in FIG. 10.

A light source 25 is provided within the video processor 6. The illuminating light emitted from this light source 25 will pass through color transmitting filters provided in a rotary filter 13 driven by a motor 14 to be converted to respective color lights of red (R), green (G) and blue (B) and will be radiated to a light guide 23 on the entrance end surface. The illuminating lights transmitted through the light guide we will be radiated to a part to be observed by a light distributing lens 21 provided in the tip part 9. The lights returning from the observed part will be made to form an image on the imaging surface of a solid state imaging device 26 by an image forming optical system. This object image will be photoelectrically converted to be an electric signal. This electric signal will be output to a preprocessing circuit 30 within the video processor 6, will be processed as determined in the pre-processing circuit 30 and then will be input as a digital signal into a picture image magnifying part 31.

On the other hand, a magnification rate controlling part 34 is provided with an imaging device sensing means 61 sensing the pixel formation of the solid state imaging device 26 and a master control 62 inputting a pixel formation sensing signal from this imaging device sensing means 61 and transmitting a magnification rate controlling signal corresponding to the pixel formation to the above mentioned picture image magnifying parts 31 and 32. The pixel formation of the solid state imaging device 26 will be sensed by the above mentioned imaging device sensing means 61, the magnification rates of the picture image magnifying parts 31 and 32 will be controlled by the above mentioned master control 62 in response to this pixel formation and the displaying view angle will be controlled to be of such desired size as, for example, a fixed displaying view angle irrespective of the pixel formation of the solid state imaging device 26.

By the way, in an electronic endoscope 1 provided in the tip part 9 with such solid state imaging device 26 as in FIG. 10, as the solid state imaging device 26 is integral with the endoscope itself, in order to sense the kind of the solid state imaging device 26, the kind of the endoscope itself may be sensed. Therefore, for example, if the connector 5 of the electronic endoscope 1 is provided with a mechanical or electric type signal generating part 36 different depending on the kind of the solid state imaging device 26 and a signal from the type signal generating part 36 is input into the above mentioned imaging device sensing means 61, the pixel formation of the solid state imaging device 26 will be able to be easily sensed.

The feature of the magnification rate controlling part 34 in this embodiment is that the picture image magnifying parts 31 and 32 can be independently controlled. However, if they can be independently controlled, it will not be necessary for the magnification rate controlling part 34 for the picture image magnifying part 31 to be integral with that for the picture image magnifying part 32 as shown in FIG. 10. That is to say, the master control 62 may be provided separately respectively for the picture image magnifying parts 31 and 32. Also, the master control 62 may be provided for each kind of such magnification rate controlling signals as the coefficient switching signal, reading-out clock and latch clock in FIGS. 4 and 8 or may be provided for each of classified magnification controlling signals.

Thus, according to this embodiment, as the pixel formation of the solid state imaging device 26 can be automatically sensed by the imaging device sensing means 61 and the magnification rate in the vertical direction and the magnification rate in the horizontal direction can be independently automatically controlled so as to make a desired displaying view angle, any desired displaying view angle required for the observation can be very easily obtained.

As different picture image magnification rates can be controlled with a common circuit, component parts can be made common and the cost can be reduced to be lower than with a circuit formation separate for each of different magnification rates and, as only the software is used, different specifications can be handled softly.

Figure 11:
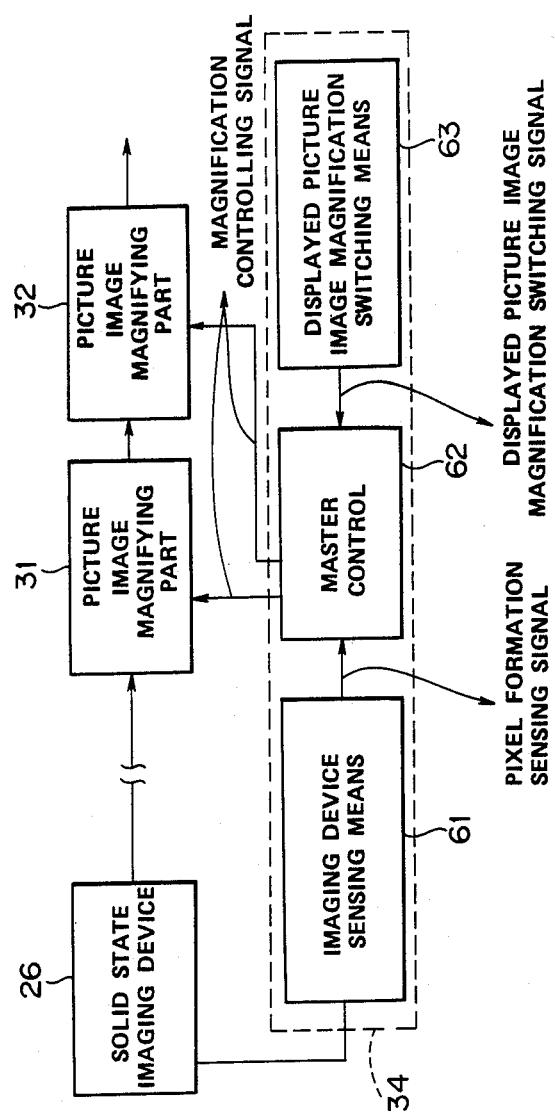
FIG. 11 is a block diagram showing the formation of the second embodiment of the present invention.

FIG. 11 is a block diagram showing the formation of the second embodiment of the present invention.

In this embodiment, a displayed picture image magnification switching means 63 is further provided in the magnification rate controlling part 34 in the first embodiment shown in FIG. 10. The size of the displayed picture image can be selected by such external input means as a push-switch in the above mentioned displayed picture image magnification switching means 63. A displayed picture image magnification switching signal from this displayed picture image magnification switching means 63 will be input into the master control 62. The above mentioned master control 62 will operate the pixel formation sensing signal from the imaging device sensing means 61 and the displayed picture image magnification switching signal from the displayed picture image magnification switching means 63 and will transmit magnification controlling signals to the picture image magnifying part 31 and 32 so as to obtain a proper magnification rate.

According to this embodiment, the pixel formation of the solid state imaging device 26 and the magnification rate of the picture image can be sensed and controlled so as to obtain any desired displaying view angle.

The other formations, operations and effects are the same as in the first embodiment.

Figure 12:
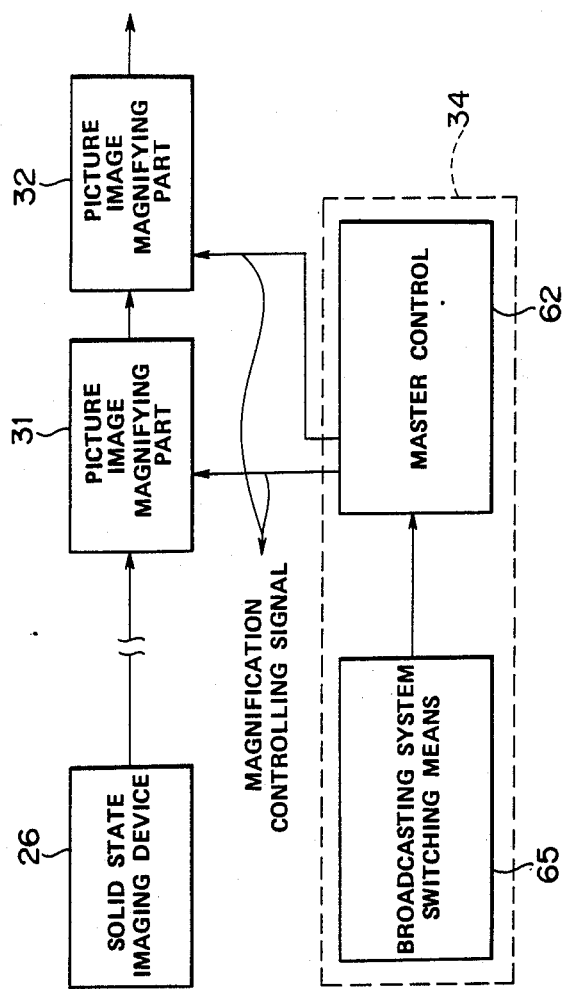
FIG. 12 is a block diagram showing the formation of the third embodiment of the present invention.

FIG. 12 is a block diagram showing the formation of the third embodiment of the present invention.

In this embodiment, a broadcasting system switching means 65 is provided in place of the imaging device sensing means 61 in the magnification rate controlling part 34 described in the first embodiment shown in FIG. 10. In this broadcasting system switching means 65, the magnification rate can be switched for the master control 62 by such switching means as a DIP switch. In this embodiment, the longitudinal magnification rate is made 625/525 times in a PAL system with an NTSC system as a reference. Thereby, the display can be seen with the same displaying view angle in both NTSC system and PAL system.

According to this embodiment, as different broadcasting systems can be coped with by only software without hardware, the cost can be reduced.

Also, in this embodiment, as the picture image magnification rate can be controlled independently in the vertical direction and horizontal direction, the interchangeability of the view angles of the current television broadcasting system and the high quality broadcasting system different in the aspect ratio can be coped with by the software.

The other formations, operations and effects are the same as in the first embodiment.

By the way, in this embodiment, only the broadcasting system switching means 65 is provided as a means of sensing or instructing the factor varying the displaying view angle. However, it is needless to say that this embodiment can be formed as freely combined with the imaging device sensing means 61 and displayed picture image magnification switching means 63 in the first and second embodiment.

Figure 13:
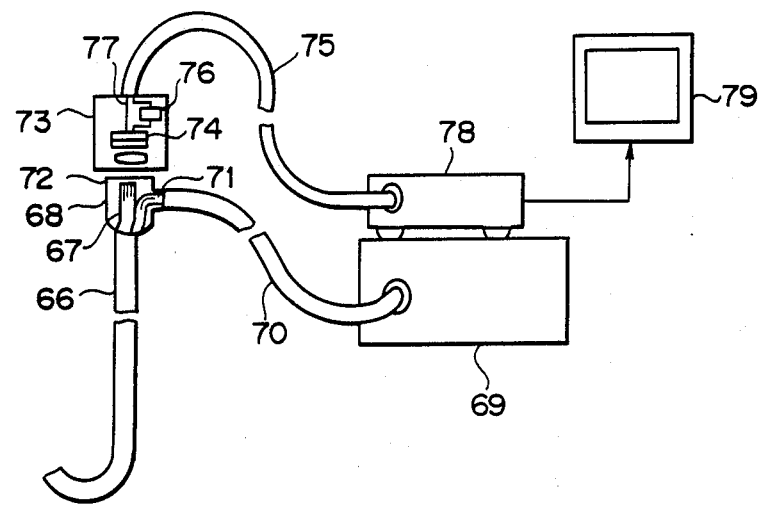
Figure 14A:
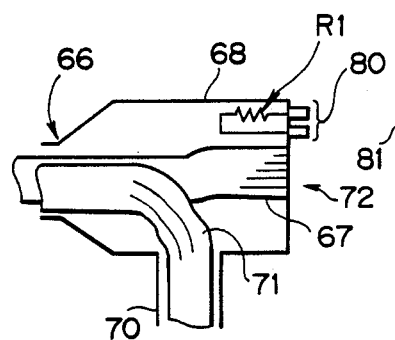
FIG. 14a and 14b are explanatory views of an endoscope sensing part.
Figure 14B:
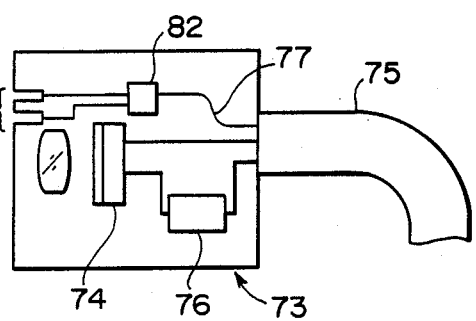
Figure 16:
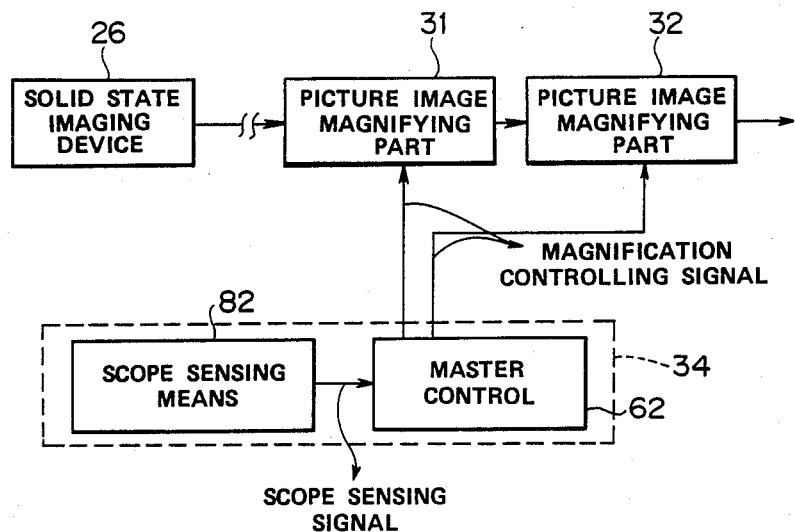

FIGS. 13 to 14 show the fourth embodiment of the present invention.

In this embodiment, the present invention is applied to an externally fitted television camera 73 fitted to a conventional fiber scope 66.

In FIG. 13, the externally fitted television camera 73 is removably fitted to an eyepiece part 72 provided at the rear end of the operating part 68 of the fiber scope 66 and is connected to a camera controlling unit 78 through a signal cable 75 extended out of the eyepiece part at the rear end. A flexible universal cable 70 is extended out of the side part of the operating part 68 and is connected to a light source apparatus 69. The illuminating light output from the light source apparatus 69 will be transmitted through a light guide 71 inserted through the universal cable 70 and will be emitted out of the tip part of the fiber scope 66 to illuminate on object to be imaged. The light returning from the object will be transmitted through an image guide 67 and the object image will be transmitted to the eyepiece part 72. This object image will be formed by an image forming lens on the imaging surface of a solid state imaging device 74 provided within the externally fitted television 73. The formed optical image will be photo-electrically converted and will be input as an electric signal into a signal processing circuit 76. A video signal produced by the signal processing circuit 76 will be delivered to the camera controlling unit 78 through a plurality of transmitting lines 77 inserted through the signal cable 75. By the way, a plurality of power source lines not illustrated which can feed an electric power to the externally fitted television camera 73 from the camera controlling unit side are also inserted through this signal cable 75.

In the above mentioned camera controlling unit 78, the picture image signal will be converted, for example, to an NTSC composite video signal which will be output to a TV monitor 79 to display the object image on the picture surface.

In FIG. 14, the sensing and instructing step shall be explained. In the eyepiece part 72 of the fiber scope 66, pins 80 connected to a resistance RI at both ends are projected rearward. When the externally fitted television camera 73 is connected to the eyepiece part 72, these pins 80 will be connected with pin receptacles 81 provided in this externally fitted television camera 73. A scope sensing circuit 82 is connected to the pin receptacles 81 so that, when a constant current is flowed through a resistance R1 and the voltage generated at both ends of the resistance R1 is discriminated, the scope will be discriminated and a scope sensing signal representing the kind of the scope will be output to the master control 62 described in the first embodiment and provided in the camera controlling unit 78. The master control 62 will deliver magnification rate controlling signals respectively to the picture image magnifying parts 31 and 32 by a scope sensing signal from the sensing circuit 82.

Now, there are conventional fiber scopes corresponding to various parts within a body cavity. The size of the picture image formed in the eyepiece part 72 is various depending on the kind of the scope.

According to this embodiment, the kind of the scope can be automatically sensed and the object image photographed by the externally fitted television camera 73 can be automatically controlled so as to be of any desired displaying view angle on the picture surface of the monitor 7. By the way, in this embodiment, an example of a flexible fiber scope is shown. However, it is needless to say that, with a rigid scope, the same effects will be obtained.

In FIG. 13, the video processor 6 of the electronic endoscope may be used.

This embodiment is to sense the image forming size of the scope eyepiece part. However, it is needless to say that merely sensing the kind of the scope is also included.

By the way, a sensing and instructing means may be formed as in FIG. 15.

In FIG. 15, a pin 86 projects at the rear end of an eyepiece part 72 of a fiber scope 66a. The pin 86S is not provided at the rear end of the eyepiece part 72 of a fiber scope 66b. A switch piece 88 forming a switch 87 is pressed against the eyepiece part side by a coil spring 89 in an externally fitted television camera 73 removably fitted to the eyepiece part 72. In case the externally fitted television camera 73 is fitted to the fiber scope 66a, this switch piece 88 will be pressed by the pin 86 to connect contacts 91 against the coil spring 89. The contacts 91 are connected to the scope sensing circuit 82 sensing the connection of the fiber scope 66a when the switch 87 is closed. In case the externally fitted television camera 73 is fitted to the fiber scope 66b, the switch piece 88 will not be pressed and the scope sensing circuit 82 will sense the connection of the fiber scope 66b with the switch 88 opened.

By the way, in FIG. 15, the pin 86 is one and two kinds of scopes can be sensed. However, a plurality of pins 86 may be provided to increase the number of sensed scopes.

The other formations, operations and effects are the same as in the first embodiment.

Figure 17:
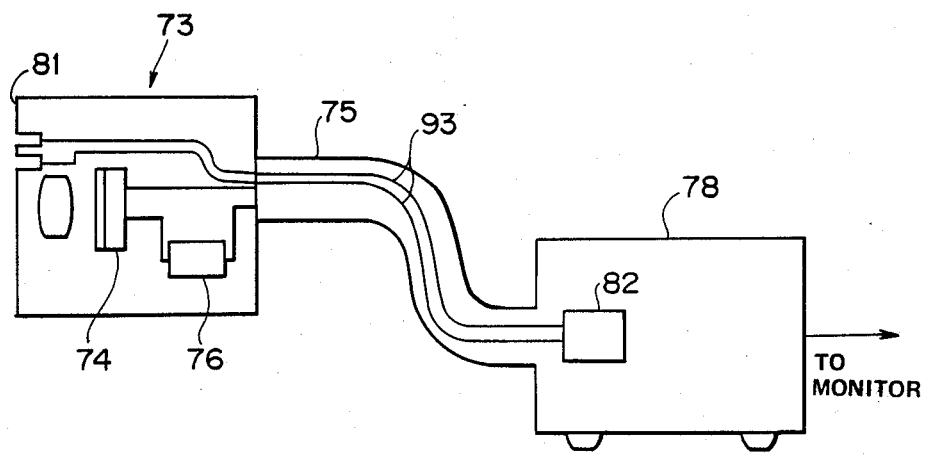
FIG. 17 relate to the fifth embodiment of the present invention and is an explanatory view of an endoscope apparatus provided with an endoscope detecting part in the camera unit.

FIG. 17 shows the fifth embodiment of the present invention.

In this embodiment, the scope sensing circuit 82 provided within the externally fitted television camera 73 in the fourth embodiment is provided in a camera controlling unit 78.

Pin receptacles 81 provided in the externally fitted television camera 73 are connected respectively to signal lines 93 inserted through a signal cable 75 and connected to a scope sensing circuit 82 provided within the camera controlling unit 78.

With such formation as in this embodiment, the scope can be sensed while maintaining the compactness of the externally fitted television camera.

The other formations, operations and effects are the same as in the fourth embodiment.

Figure 18:
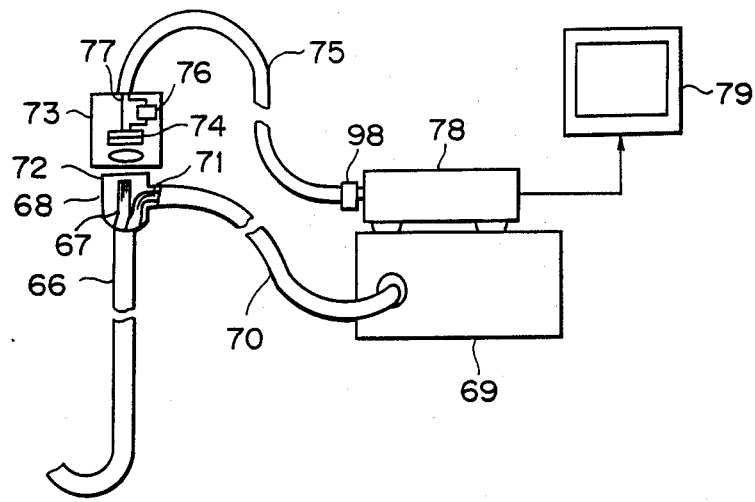
FIGS. 18 and 19 relate to the sixth embodiment of the present invention.
Figure 19:
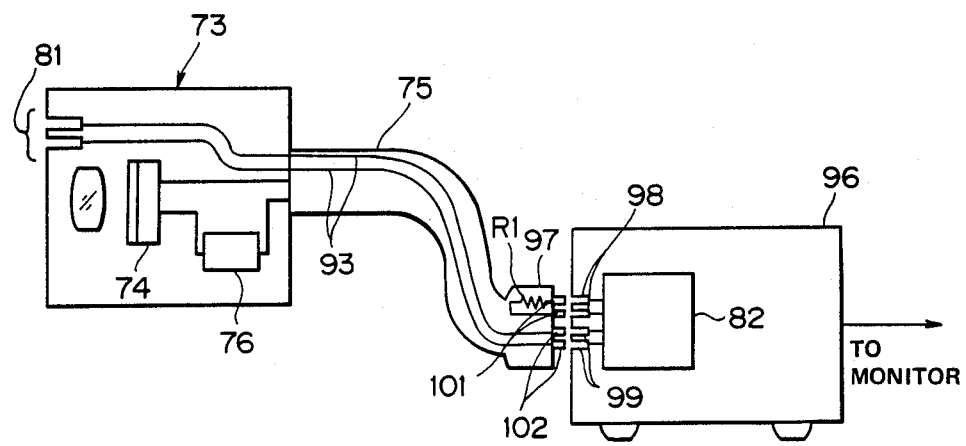

FIGS. 18 and 19 show the sixth embodiment of the present invention.

In this embodiment, the signal cable of the externally fitted television camera described in the fifth embodiment is provided with a connector through which the externally fitted television camera can be connected to the camera controlling unit.

Not only the externally fitted television camera 73 but also an electronic endoscope can be connected to the camera controlling unit 96.

This camera controlling unit 96 is provided with pin receptacles 98 for detecting the kind of the electronic endoscope and pin receptacles 99 for detecting the kind of the fiber scope. These pin receptacles 98 and 99 are connected to the scope sensing circuit 82.

On the other hand, a connector 97 provided at the rear end of the signal cable of the externally fitted television camera 73 is provided with pins 101 and 102 which can be connected respectively to the above mentioned pin receptacles 98 and 99. A resistance R1 provided within the connector 97 is connected to the pins 101 so that a constant current may be fed through the pin receptacles 98 from the scope sensing circuit 82. When this constant current is fed, the kind of the electronic scope will be sensed by sensing the voltage generated at both ends of the resistance R1. The pins 102 are connected to pin receptacles 81 provided in the externally fitted television camera 73 through signal lines 93 inserted through a signal cable 75. The fiber scope 66 shown in FIG. 14 is to be connected to these pin receptacles 81 so that the kind of the fiber scope may be sensed the same as is mentioned above.

When the kind of the scope is sensed, the scope sensing circuit 82 will output a scope sensing signal to the master control so that any desired displaying view angle may be obtained.

In this embodiment, as shown in FIG. 14 (b), the scope sensing circuit 82 may be provided within the externally fitted television camera 73.

The other formations, operations and effects are the same as in the fourth embodiment.

Figure 20:
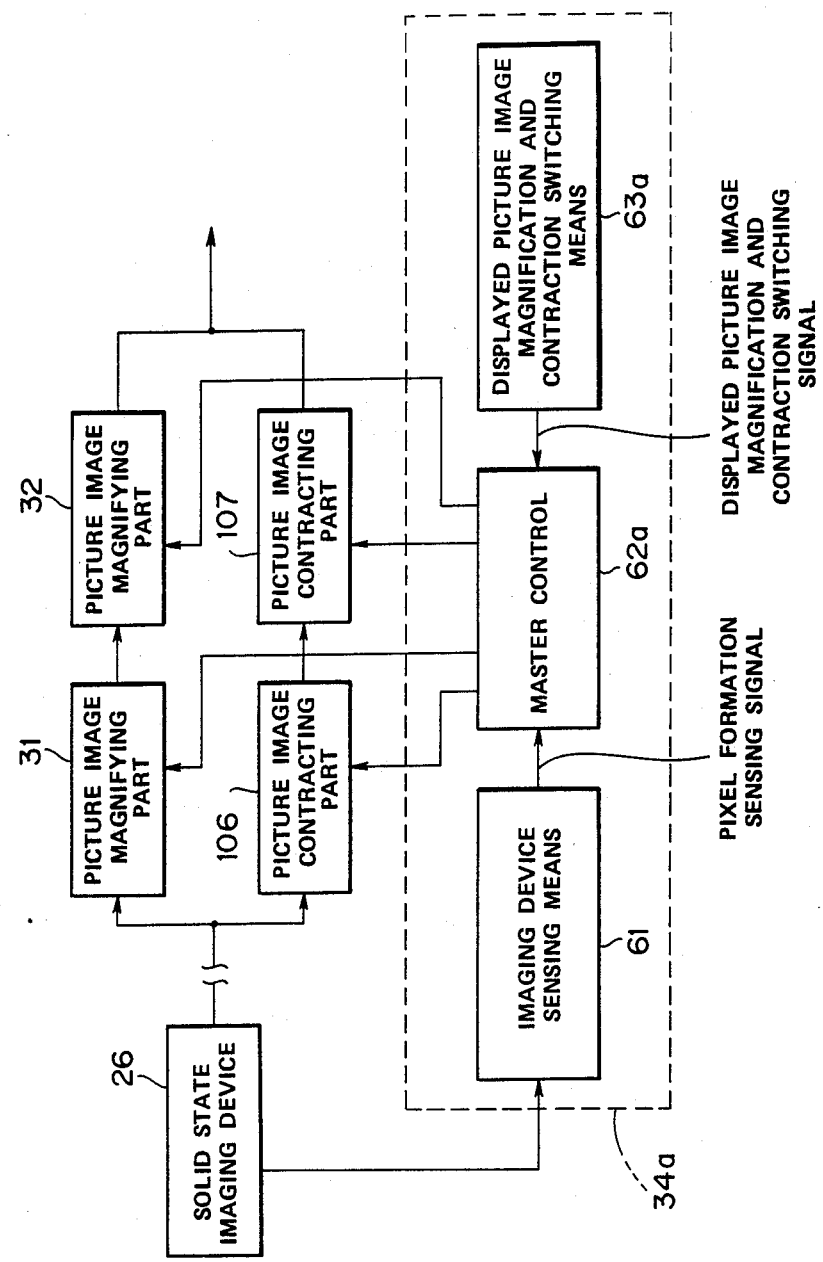
FIGS. 20 to 22 relate to the seventh embodiment of the present invention.
Figure 21:
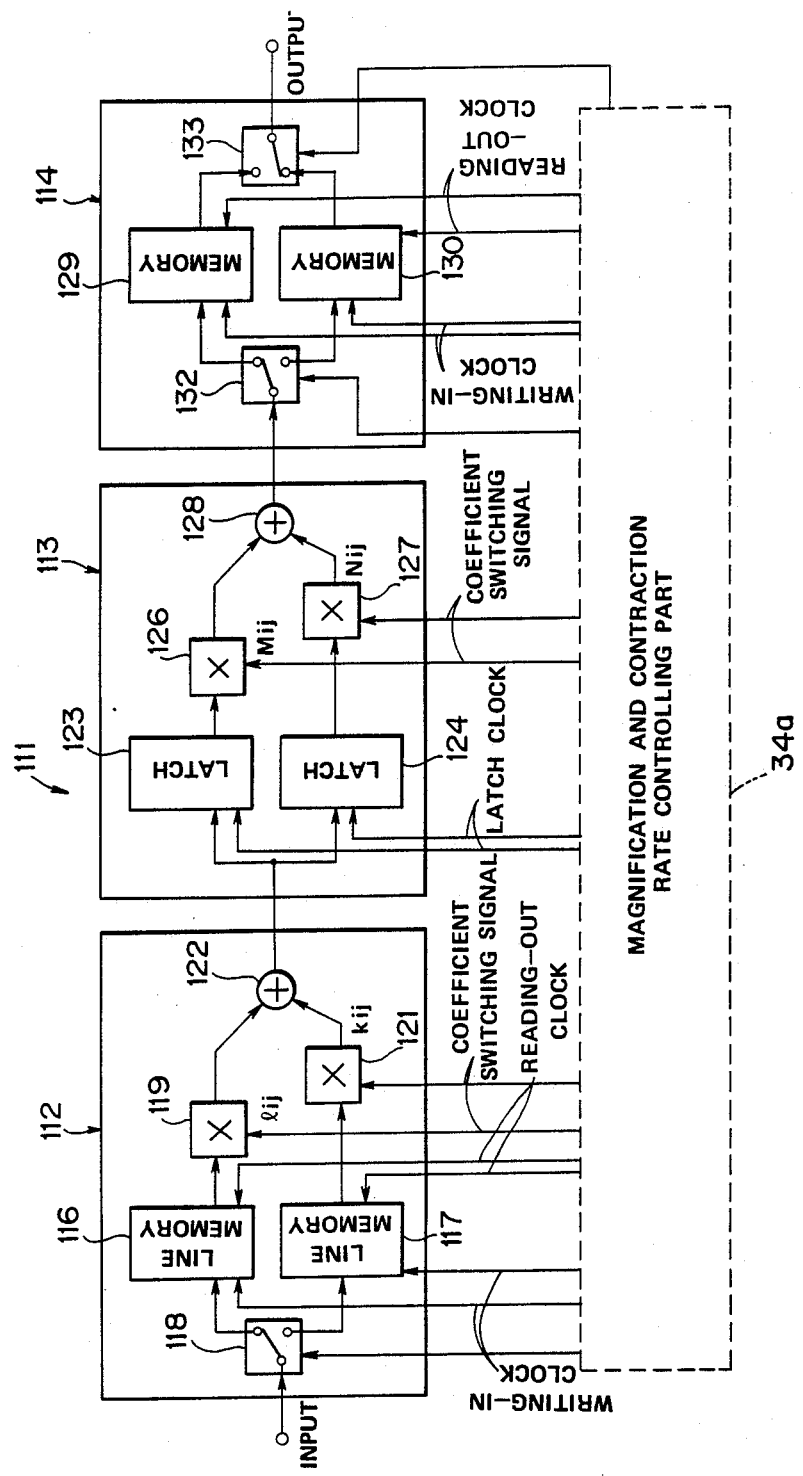
Figure 22:
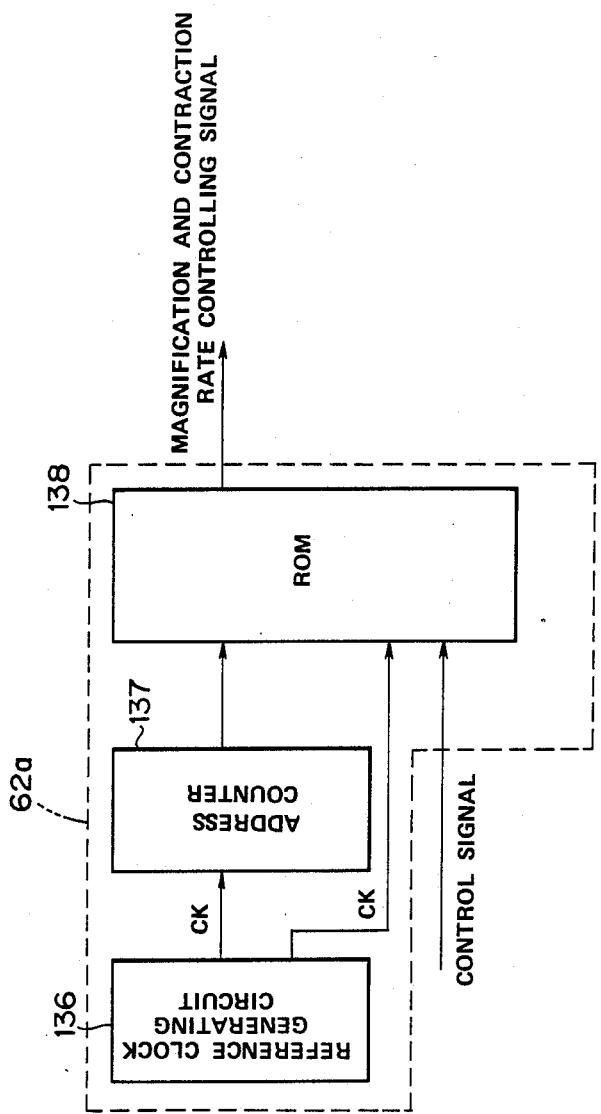

FIGS. 20 to 22 show the seventh embodiment of the present invention.

The endoscope apparatus of this embodiment has a picture image contracting part in addition to the formation of the first embodiment.

In FIG. 20, the video signal obtained from the solid state imaging device 26 will be branched and the video signal on one side will be magnified and interpolated in the vertical or horizontal direction by the first magnifying part 31. The video signal from this first picture image magnifying part 31 will be magnified and interpolated by the second picture image magnifying part 32 in the direction vertical to the direction in which the above mentioned video signal on one side has been magnified by the above mentioned first picture image magnifying part 31. The video signal on the other side will be contracted by the first picture image contracting pat 106 in the vertical or horizontal direction. The video signal from this first picture image contracting part 106 will be contracted by the second picture image contracting part 107 in the direction vertical to the direction in which the above mentioned video signal on the other side has been contracted by the above mentioned first picture image contracting part 106.

By the way, the first and second picture image magnifying parts 31 and 32 and the first and second picture image contracting parts 106 and 107 form a picture image displaying magnification rate varying means.

The first and second picture image magnifying parts 31 and 32 and the first and second picture image contracting parts 106 and 107 will be controlled in the magnification rate, interpolation rate and contraction rate of the picture image by a master control 62a provided in a magnification and contraction rate controlling part 34a as a picture image displaying magnification rate controlling means. A pixel formation sensing signal from an imaging device sensing means 61 sensing the pixel formation of the solid state imaging device 26 will be input into the master control 62a and a magnification and contraction rate controlling signal to which the pixel formation corresponds will be delivered to the above mentioned picture image magnifying parts 31 and 32 and picture image contracting parts 106 and 107. Further, a control signal from a displayed picture image magnification and contraction switching means 63a will be input into the master control 62a. This displayed picture image magnification and contraction switching means 63a can select the size of the displayed picture image by such external input means as a push-switch. The displayed picture image magnification and contraction switching signal from this displayed picture image magnification and contraction switching means 63a will be input into the master control 62a. The above mentioned master control 62a will operate the pixel formation sensing signal from the above mentioned imaging device sensing means 61 and the displayed picture image magnification and contraction switching signal from the displayed picture image magnification and contraction switching means 63a and will output magnification rate controlling signals to the picture image magnifying parts 31 and 32 or will output contraction rate controlling signals to the picture image contracting parts 106 and 107 so as to make proper magnification and contraction rates.

The picture image magnifying parts 31 and 32 are the same as are described in the first embodiment. The picture image contracting parts 106 and 107 and the magnification and contraction rate controlling part 34a shall be explained with reference to FIG. 21.

The picture image contracting circuit 111 is conceptually to make an operation of thinning and reducing the numbers of original picture image scanning lines and horizontal pixels and is controlled by the magnification and contraction rate controlling part 34a.

The picture image contracting circuit 111 consists of three elements of a vertical picture image contracting circuit 112, horizontal picture image contracting circuit 113 and time base corrector (abbreviated as TBC hereinafter) 114 as largely divided.

The above mentioned vertical picture image contracting circuit 112 comprises two line memories 116 and 117, a switching switch 118 transmitting an input signal alternately to the above mentioned line memories 116 and 117, look-up tables 119 and 121 multiplying the outputs of the above mentioned line memories 116 and 117 respectively by $lij$ and $kij$ times and an adder 122 adding and outputting the outputs of these look-up tables 119 and 121. Two adjacent scanning line data of each of a plurality of scanning lines determined by a contraction rate will be read out of the above mentioned line memories 116 and 117, will be multiplied respectively by the coefficients $lij$ and $kij$ determined by the contraction rates respectively in the look-up tables 119 and 121 and will be added in the adder 122 and new scanning line data of the same contracted picture image will be determined and will be input into the horizontal picture image contracting circuit 114 in the later step.

The above mentioned horizontal picture image contracting circuit 113 comprises two latches 123 and 124 inputting the output signal of the above mentioned vertical picture image contracting circuit 112 and an adder 128 adding and outputting the outputs of look-up tables 126 and 127 respectively multiplying the outputs of the above mentioned latches 123 and 124a respectively by $mij$ and $nij$ times. Two adjacent pixel data of each of a plurality of pixels determined by the contraction rate of new scanning lines will be held in the above mentioned latches 123 and 124, will be respectively multiplied by the coefficients $mij$ and $nij$ times determined by the same contraction rate respectively in the above mentioned look-up tables 126 and 127 and will be added in the above mentioned adder 128 to determine new pixel data of the contracted picture image which will be input into the TBC 114 in the later step.

The above mentioned TBC 114 comprises two memories 129 and 130 switching alternately a writing-in operation and reading-out operation for each field, a switching switch 132 transmitting the signal from the above mentioned horizontal picture image contracting circuit 113 to one of the above mentioned memories 129 and 130 for each field and a switching switch 133 selecting one of the above mentioned memories 129 and 130 for each field and outputting the signal. This switching switch 133 will select the memory on the side not selected by the above mentioned switch 132. In this first field period, the data of the contracted picture image determined by the operation will be written in turn into one of the memories 129 and 130, for example, the memory 129 through the above mentioned switching switch 132. At this time, the data of the contracted picture image will be read out of the other memory 130 as synchronized with the television synchronous signal so that the contracted picture image may be displayed in a predetermined position of the monitor 7. In the second field, on the contrary, the data will be read out of the memory 129 and the contents of the memory 130 will be renewed. An example of the above mentioned master control 62a provided in the magnification and contraction rate controlling part 34a shall be explained with reference to FIG. 22.

The master control 62a comprises a reference clock generating circuit 136, address counter 137 and ROM 138. The data for the magnification and contraction are input in advance in the ROM 138. The magnification and contraction rate controlling signals shown in FIGS. 6 (a), (c) and (d) will be output to the picture image magnifying parts 31 and 32 and picture image contracting parts 106 and 107 in response to the data of the address counter 137 making a counting operation as synchronized with the reference clock generating circuit 136. At this time, which data within the ROM 138 is to be output will be switched by the Rom 138 in response to such control signal as the pixel formation sensing signal or displayed picture image magnification and contraction rate switching signal.

As mentioned above, according to this embodiment, the pixel formation of the solid state imaging device 26 and the magnification and contraction rates of the picture image can be automatically controlled by being automatically sensed so as to make any desired displaying view angle.

The other formations, operations and effects are the same as in the first embodiment.

Figure 23:
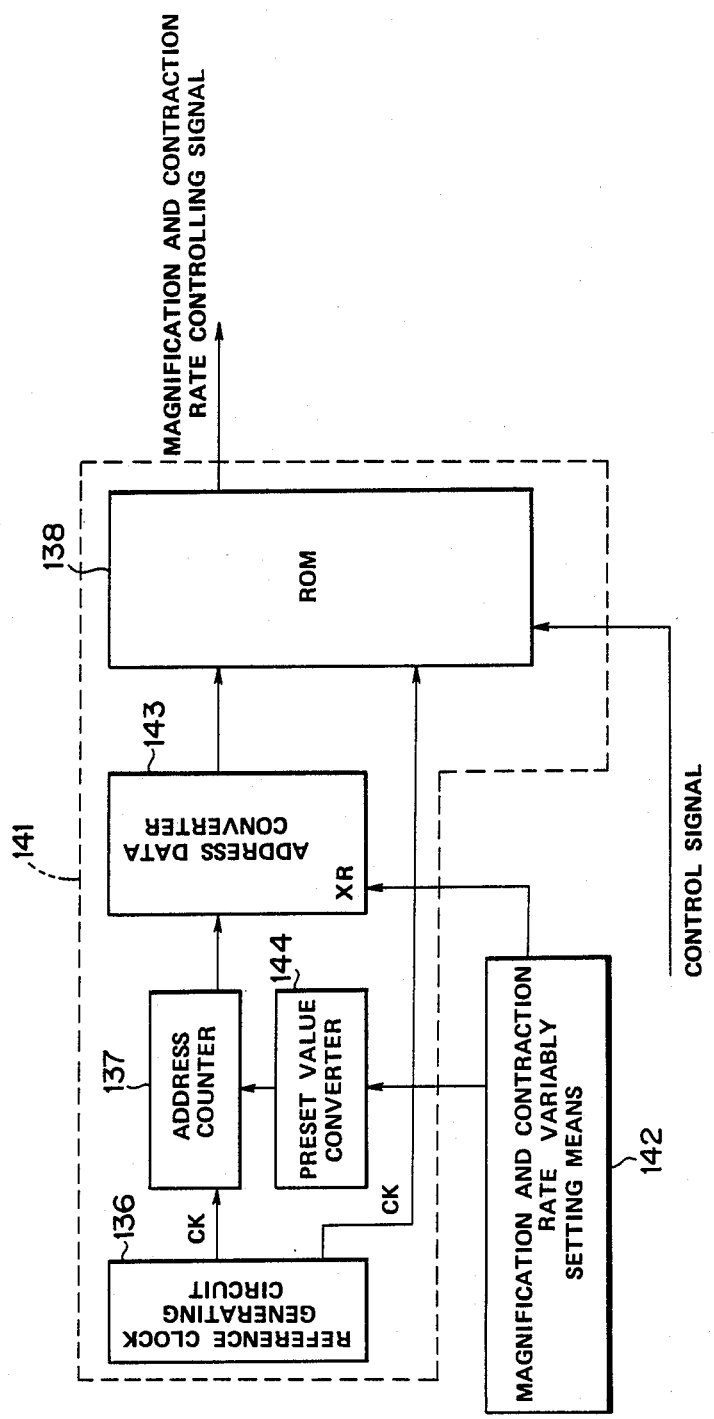
FIG. 23 relates to the eighth embodiment of the present invention and is a block diagram for explaining a master control.

FIG. 23 shows the eighth embodiment of the present invention.

This embodiment is an example of a master control whereby the magnification and contraction rates are manually variable and is formed so that the rate of magnification or contraction may be freely varied from the initially set value by such magnification and contraction rate variably setting means 142 as an up-and-down switch as a sensing and instructing means.

The master control 141 comprises a reference clock generating circuit 136, address counter 137, address data converter 143, preset value converter 144 and ROM 138.

In accordance with the input from the above mentioned magnification and contraction rate variably setting means 142, in the preset value converter 144, the address counting will start in response to the magnification and contraction rate P. The address data converter 143 will receive the rate converting output of the magnification and contraction rate variably setting means 142. By the way, in the case of the magnification in the horizontal direction, as the data of the same pixels in the horizontal direction are used for the pixels having a video image region and are displayed on the picture surface of the monitor 7, the address counter 137 will count addresses in turn in the horizontal direction and the output data will be input into the address data converter 143 making the magnification and contraction. This address data converter 143 will convert the address data so as to read out the same pixels corresponding to the conversion rate P. For example, in the case of the magnification of a rate P of 2 times, the outputs of the address counter will be 1, 2, 3,—, n−1, n and the outputs of the address data converter will be 1, 1, 2, 2, 3, 3,—n, n.

In the case of the magnification in the vertical direction, the output data of the address counter 137 in the vertical direction may be converted by the address data converter 143 so that the same scanning lines may be displayed on the picture surface of the monitor 7 in response to the conversion rate P.

As mentioned above, in this embodiment, after being once set at a standard view angle, any desired picture image magnification and contraction rates can be selected.

By the way, it is needless to say that, in the case of the contraction, the contraction can be displayed by partly extracting the picture image from the picture image data before the contraction. The address data converter 143 may be included in a ROM 138 or may be formed of another ROM.

The other formations, operations and effects are the same as in the seventh embodiments.

Figure 24:
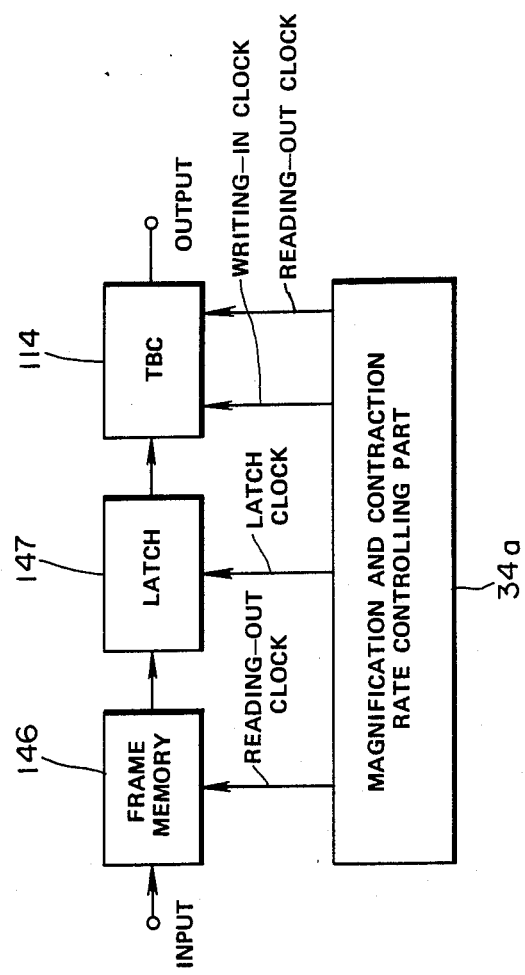
FIG. 24 relates to the ninth embodiment of the present invention and is a block diagram for explaining a contracting circuit.

FIG. 24 shows the ninth embodiment of the present invention and illustrated a picture image contracting part in the case that the solid state imaging device 26 has a sufficient number of pixels for the displayed view angle.

In FIG. 24, the video signal for one frame obtained from the solid state imaging device 26 will be accumulated in a frame memory 146 and the required scanning lines only will be read out according to the reading-out clock output from the magnification and contraction rate controlling part 34a in response to the picture image contracting rate to thin the scanning lines. The video signal having had the scanning lines thinned in the vertical direction by the frame memory 146 will be delivered to a latch 147 which will read out the video signal by a pixel unit according to the latch clock output in response to the picture image contracting rate from the magnification and contraction rate controlling part 34a to thin the pixel data of the video signal in the horizontal direction. The video signal having had the pixel data thinned in the horizontal direction by the latch 147 will be corrected in the time axis to obtain a contract video signal.

The other formations, operations and effects are the same as in the first embodiment.

By the way, the present invention can be applied not only to an electronic endoscope having a solid state imaging device in the it part of the insertable part but also to an endoscope apparatus using an externally fitted television camera connected to the eyepiece part of such endoscope whereby the naked eye observation is possible as a fiber scope.

As explained above, there is an effect that displaying at any desired displaying view angle is possible irrespective of the pixel formation of the solid state imaging device, the picture image magnification rate and the television broadcasting system.

What is claimed is:

1. An electronic endoscope apparatus comprising:
an imaging means having an elongated insertable part to be inserted into a body cavity and a solid state imaging device outputting as an electric signal an object image obtained through an observing window provided in the tip part of said insertable part;
a video signal processing means driving said solid state imaging device and processing said read out electric signal to produce a video signal;
a picture image displaying rate varying means capable of either magnifying or contracting in at least one of the vertical direction and horizontal direction said object image imaged by said solid state imaging device on the basis of the picture image displaying rate by inputting said video signal;
a monitor means displaying said object image magnified or contracted by said picture image displaying rate varying means;
a picture image displaying rate controlling means capable of controlling independently in at least one of the vertical direction and horizontal direction the picture image displaying rate of said picture image displaying rate varying means adjust the view angle of the picture image displayed by said monitor means; and
a sensing and instructing means sensing or instructing the factor varying said displaying view angle and outputting a signal relating to the picture image displaying rate to said picture image displaying rate controlling means.

2. An electronic endoscope apparatus according to claim 1 wherein said imaging means is an electronic endoscope electrically converting and outputting an object image.

3. An electronic endoscope apparatus according to claim 1 wherein said imaging means is formed of an optical endoscope having an image guide means transmitting an object image and a television camera capable of being fitted to said optical endoscope and imaging an object image.

4. An electronic endoscope apparatus according to claim 1 wherein said picture image displaying rate varying means comprises a horizontal picture image magnifying means magnifying a picture image in the horizontal direction and a vertical picture image magnifying means magnifying a picture image in the vertical direction.

5. An electronic endoscope apparatus according to claim 1 wherein said picture image displaying rate varying means comprises a horizontal picture image contracting means contracting a picture image in the horizontal direction and a vertical picture image contracting means contracting a picture image in the vertical direction.

6. An electronic endoscope apparatus according to claim 4 wherein said horizontal picture image magnifying means produces new video data by multiplying adjacent video data respectively by interpolating coefficients in the horizontal direction and adding said interpolated video data.

7. An electronic endoscope apparatus according to claim 6 wherein said horizontal picture image magnifying means is provided with a plurality of horizontal interpolating coefficients corresponding to the picture image displaying rates.

8. An electronic endoscope apparatus according to claim 4 wherein said vertical picture image magnifying means produces new scanning line data by adding synchronized scanning line data of two adjacent lines multiplied respectively by vertical interpolating coefficients.

9. An electronic endoscope apparatus according to claim 8 wherein said vertical picture image magnifying means is provided with plurality of vertical direction interpolating coefficients corresponding to the picture image displaying rates.

10. An electronic endoscope apparatus according to claim 5 wherein said vertical picture image contracting means produces new scanning line data by multiplying at least two nearby scanning line data for each of a plurality of scanning lines determined by contraction rates respectively by vertical direction interpolating coefficients and adding said interpolated scanning line data.

11. An electronic endoscope apparatus according to claim 10 wherein said vertical picture image contracting means is provided with a plurality of vertical direction interpolating coefficients corresponding to picture image displaying rates.

12. An electronic endoscope apparatus according to claim 5 wherein said horizontal picture image contracting means produces new pixel data by multiplying at least two nearby pixel data for each of a plurality of pixels determined by the contraction rate of the picture image by horizontal direction interpolating coefficients and adding said interpolated pixel data.

13. An electronic endoscope apparatus according to claim 12 wherein said horizontal picture image contracting means is provided with a plurality of horizontal direction interpolating coefficients corresponding to the picture image displaying rates.

14. An electronic endoscope apparatus according to claim 1 wherein said picture image displaying rate controlling means can output a coefficient switching signal selecting said vertical and horizontal direction interpolating coefficients to at least one of said horizontal picture image magnifying means and vertical picture image magnifying means.

15. An electronic endoscope apparatus according to claim 1 wherein said picture image displaying rate controlling means can output a coefficient switching signal selecting said vertical and horizontal direction interpolating coefficients to at least one of said horizontal picture image contracting means and vertical picture image contracting means.

16. An electronic endoscope apparatus according to claim 1 wherein said sensing and instructing means senses the pixel formation of said solid state imaging device and outputs a signal relating to the picture image displaying rate corresponding to said pixel formation to said picture image displaying rate controlling means.

17. An electronic endoscope apparatus according to claim 1 wherein said sensing and instructing means externally inputs a signal selecting the size of the displayed picture image of said monitor means and outputs a signal relating to the picture image displaying rate corresponding to said signal to said picture image displaying rate controlling means to adjust the view angle of said monitor means.

18. An electronic endoscope apparatus according to claim 1 wherein said sensing and instructing means senses the broadcasting system corresponding to said video signal processing means and outputs a signal relating to the picture image displaying rate corresponding to said broadcasting system to said picture image displaying rate controlling means.

19. An electronic endoscope apparatus according to claim 1 wherein said sensing and instructing means inputs a control signal which can set a magnification rate or contraction rate of a continuous numerical value into said picture image displaying rate limiting means.

20. An imaging apparatus processing an electric signal obtained from an electronic endoscope comprising;
a video signal processing means processing an electric signal output from a solid state imaging device as an imaging means to produce a video signal;
a picture image displaying rate varying means capable of either magnifying or contracting in at least one of the vertical direction and horizontal direction an object image imaged by said solid state imaging device;
a picture image displaying rate controlling means capable of controlling independently in the vertical direction and horizontal direction the picture image displaying rate of said picture image displaying rate varying means to adjust the view angle of the picture image displayed by said object image; and
a sensing and instructing means sensing or instructing the factor varying said displaying view angle and outputting a signal relating to the picture image displaying rate to said picture image displaying rate controlling means.

21. An imaging apparatus according to claim 20 wherein said picture image displaying rate varying means comprises a horizontal picture image magnifying means magnifying a picture image in the horizontal direction and a vertical picture image magnifying means magnifying a picture image in the vertical direction.

22. An imaging apparatus according to claim 20 wherein said picture image displaying rate varying means comprises a horizontal picture image contracting means contracting a picture image in the horizontal direction and a vertical picture image contracting means contracting a picture image in the vertical direction.

23. An imaging apparatus according to claim 21 wherein said horizontal picture image magnifying means produces new video data by multiplying adjacent video data respectively by interpolating coefficients in the horizontal direction and adding said interpolated video data.

24. An imaging apparatus according to claim 23 wherein said horizontal picture image magnifying means is provided with a plurality of horizontal interpolating coefficients corresponding to the picture image displaying rates.

25. An imaging apparatus according to claim 21 wherein said vertical picture image magnifying means produces new scanning line data by adding synchronized scanning line data of two adjacent lines multiplied respectively by vertical interpolating coefficients.

26. An imaging apparatus according to claim 25 wherein said vertical picture image magnifying means is provided with a plurality of vertical direction interpolating coefficients corresponding to the picture image displaying rates.

27. An imaging apparatus according to claim 22 wherein said vertical picture image contracting means produces new scanning line data by multiplying at least two nearby scanning line data for each of a plurality of scanning lines determined by contraction rates respectively by vertical direction interpolating coefficients and adding said interpolated scanning line data.

28. An imaging apparatus according to claim 27 wherein said vertical picture image contracting means is provided with a plurality of vertical direction interpolating coefficients corresponding to picture image displaying rates.

29. An imaging apparatus according to claim 22 wherein said horizontal picture image contracting means produces new pixel data by multiplying at least two nearby pixel data for each of a plurality of pixels determined by the contraction rate by horizontal direction interpolating coefficients and adding said interpolated pixel data.

30. An imaging apparatus according to claim 29 wherein said horizontal picture image contracting means is provided with a plurality of horizontal direction interpolating coefficients corresponding to the picture image displaying magnification rates.

31. An imaging apparatus according to claim 20 wherein said picture image displaying rate controlling means can output a coefficient switching signal selecting said vertical and horizontal direction interpolating coefficients to at least one of said horizontal picture image magnifying means and vertical picture image magnifying means.

32. An imaging apparatus according to claim 20 wherein said picture image displaying rate controlling means can output a coefficient switching signal selecting said vertical and horizontal direction interpolating coefficients to at least one of said horizontal picture image contracting means and vertical picture image contracting means.

33. An imaging apparatus according to claim 20 wherein said sensing and instructing means senses the pixel formation of said solid state imaging device and outputs a signal relating to the picture image displaying rate corresponding to said pixel formation to said picture image displaying rate controlling means.

34. An imaging apparatus according to claim 20 wherein said sensing and instructing means externally inputs a signal selecting the size of the displayed picture image of said monitor means and outputs a signal relating to the picture image displaying rate corresponding to said signal to said picture image displaying rate controlling means to adjust the view angle of said monitor means.

35. An imaging apparatus according to claim 20 wherein said sensing and instructing means senses the broadcasting system corresponding to said video signal processing means and outputs a signal relating to the picture image displaying rate corresponding to said broadcasting system to said picture image displaying rate controlling means.

36. An imaging apparatus according to claim 20 wherein said sensing and instructing means inputs a control signal which can freely set a magnification rate or contraction rate into said picture image displaying rate limiting means.

37. An imaging apparatus according to claim 5 wherein said vertical picture image contracting means is to thin the scanning lines determined by the picture image displaying rate and can select the scanning lines to be thinned in response to the picture image displaying rate.

38. An imaging apparatus according to claim 5 wherein said horizontal picture image contracting means is to thin the pixel data determined by the picture image displaying rate and can select the pixels to be thinned in response to the picture image displaying rate.

39. An imaging apparatus according to claim 22 wherein said vertical picture image contracting means is to thin the scanning lines determined by the picture image displaying rate and can select the scanning lines to be thinned in response to the picture image displaying rate.

40. An imaging apparatus according to claim 22 wherein said horizontal picture image contracting means is to thin the pixel data determined by the picture image displaying rate and can select the pixels to be thinned in response to the picture image displaying rate.

* * * * *

UNITED STATES PATENT AND TRADEMARK OFFICE
CERTIFICATE OF CORRECTION

PATENT NO. : 4,894,715

DATED : Januray 16, 1990

INVENTOR(S) : UCHIKUBO et al

It is certified that error appears in the above-identified patent and that said Letters Patent is hereby corrected as shown below:

On the cover page, Item [75], after "Hino," add --Masao Uehara; Katsuyoshi Sasagawa; Shinji Yamashita, all of Tokyo,--.

Signed and Sealed this

Fourth Day of June, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,894,715

DATED : January 16, 1990

INVENTOR(S) : UCHIKUBO et al

It is certified that error appears in the above-identified patent and that said Letters Patent is hereby corrected as shown below:

On the title page, after item [22], the following should appear:  --[30]  Foreign Application Priority Data

August 8, 1988 [JP]    Japan ............. 63-206805--.

Signed and Sealed this

First Day of December, 1992

*Attest:*

DOUGLAS B. COMER

*Attesting Officer*    Acting Commissioner of Patents and Trademarks